US011494593B2

(12) United States Patent
Krishna et al.

(10) Patent No.: US 11,494,593 B2
(45) Date of Patent: Nov. 8, 2022

(54) METHODS AND APPARATUS FOR MACHINE LEARNING MODEL HYPERPARAMETER OPTIMIZATION

(71) Applicant: Walmart Apollo, LLC, Bentonville, AR (US)

(72) Inventors: Chepuri Shri Krishna, Karnataka (IN); Swarnim Narayan, Karnataka (IN); Diksha Manchanda, Karnataka (IN); Amit Agarwal, Karnataka (IN)

(73) Assignee: Walmart Apollo, LLC, Bentonville, AR (US)

( * ) Notice: Subject to any disclaimer, the term of this patent is extended or adjusted under 35 U.S.C. 154(b) by 395 days.

(21) Appl. No.: 16/823,129

(22) Filed: Mar. 18, 2020

(65) Prior Publication Data

US 2021/0295107 A1    Sep. 23, 2021

(51) Int. Cl.
*G06K 9/62* (2022.01)
*G06N 7/00* (2006.01)
(Continued)

(52) U.S. Cl.
CPC ....... *G06K 9/6263* (2013.01); *G06F 16/9538* (2019.01); *G06K 9/6256* (2013.01); *G06N 3/08* (2013.01); *G06N 7/005* (2013.01)

(58) Field of Classification Search
USPC .......................................... 705/25; 382/156
See application file for complete search history.

(56) References Cited

U.S. PATENT DOCUMENTS 8,489,641 B1 *   7/2013  Seefeld ............... G06F 16/9537
                                          715/788
9,800,727 B1 * 10/2017  Chakrabarty ......... H04L 67/146
(Continued)

OTHER PUBLICATIONS

Germain, Mathieu et al., "MADE: Masked Autoencoder for Distribution Estimation," Proceedings of the 32nd International Conference on Machine Learning (JMLR), Lille, France, 2015, 10 pages.
(Continued)

*Primary Examiner* — Ali Bayat
(74) *Attorney, Agent, or Firm* — Morgan, Lewis & Bockius LLP; Manita Rawat

(57) ABSTRACT

This application relates to apparatus and methods for optimizing hyperparameters for machine learning models. In some examples, a computing device configures a machine learning model with a first set of hyperparameters from a pool of hyperparameters. The computing device may execute the machine learning model to generate a validation score, and may update parameters of a probability determination model based on the validation score. Further, the computing device may execute the probability determination model to generate probabilities corresponding to the first set of hyperparameters. The computing device may also determine a second set of hyperparameters from the pool of hyperparameters based on the generated probabilities, and may configure the machine learning model with the second set of hyperparameters. The computing device may repeat the process of generating validation scores, updating the parameters, and generating probabilities to determine sets of hyperparameters until at least one condition is satisfied.

20 Claims, 10 Drawing Sheets

(51) Int. Cl.
*G06F 16/9538* (2019.01)
*G06N 3/08* (2006.01)

(56) References Cited

U.S. PATENT DOCUMENTS

| | | | |
|---|---|---|---|
| 10,217,061 B2 | 2/2019 | Hayes et al. | |
| 10,282,237 B1 | 5/2019 | Johnson et al. | |
| 10,379,913 B2 | 8/2019 | Johnson et al. | |
| 10,445,150 B1 | 10/2019 | Johnson et al. | |
| 10,528,891 B1 | 1/2020 | Cheng et al. | |
| 10,558,934 B1 | 2/2020 | Cheng et al. | |
| 10,565,025 B2 | 2/2020 | Johnson et al. | |
| 10,818,348 B2 * | 10/2020 | Shibata | G11C 11/5635 |
| 2011/0258118 A1 * | 10/2011 | Ciurea | G06Q 20/40 705/44 |
| 2011/0320246 A1 * | 12/2011 | Tietzen | G06Q 30/02 705/14.4 |
| 2018/0137857 A1 * | 5/2018 | Zhou | G10L 15/02 |
| 2019/0147362 A1 | 5/2019 | Hayes et al. | |
| 2019/0156229 A1 | 5/2019 | Tee et al. | |
| 2020/0019888 A1 | 1/2020 | McCourt et al. | |
| 2020/0065705 A1 | 2/2020 | Cheng et al. | |
| 2020/0184515 A1 * | 6/2020 | deWet | G06Q 30/0277 |
| 2020/0250529 A1 | 8/2020 | Murata | |
| 2020/0357392 A1 * | 11/2020 | Zhou | G10L 15/1822 |
| 2021/0037000 A1 * | 2/2021 | Attard | H04L 63/102 |

OTHER PUBLICATIONS

Williams, Ronald, J., "Simple Statistical Gradient-Following Algorithms for Connectionist Reinforcement Learning," Machine Learning, 1992, pp. 229-256.
Zoph, Barret et al., "Neural Architecture Search with Reinforcement Learning," arXiv preprint arXiv:1611.01578, Nov. 5, 2016, 16 pages.
Krishna, et al., "Neural Architecture Search with Reinforce and Masked Attention Autoregressive Density Estimators," Jun. 2, 2020, pp. 1-13.
Dong et al., "AutoHAS: Efficient Hyperparameter And Architecture Search," 2021, pp. 1-11.
Krishna, et al., "Hyperparameter optimization with REINFORCE and Transformers," Nov. 5, 2020, 10 pages.
Allen et al., "Mean Actor-Critic," May 22, 2018, 10 pages.

* cited by examiner

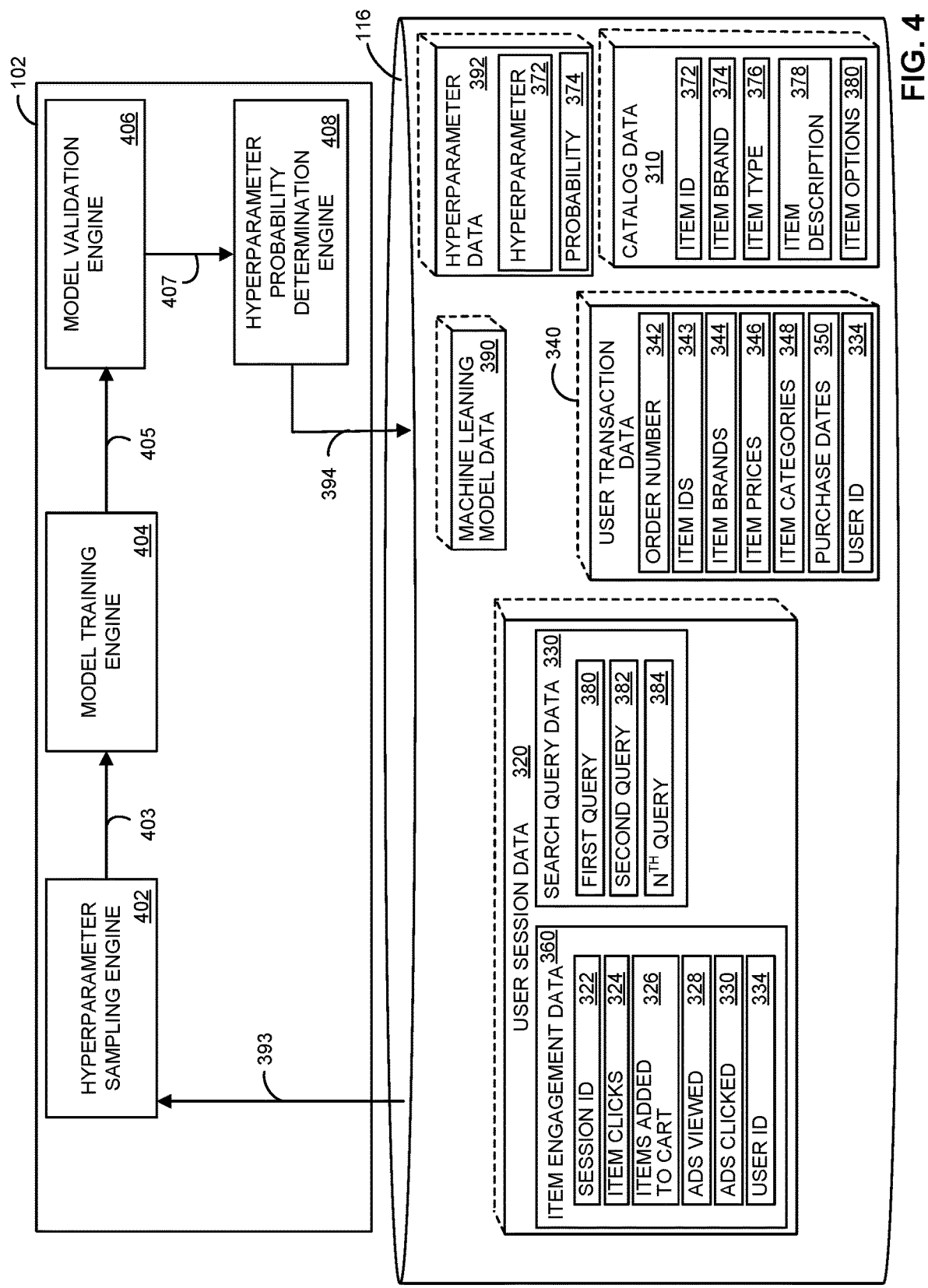

METHODS AND APPARATUS FOR MACHINE LEARNING MODEL HYPERPARAMETER OPTIMIZATION

TECHNICAL FIELD

The disclosure relates generally to machine learning models and, more specifically, to executing machine learning models with optimized hyperparameters.

BACKGROUND

Machine learning models use parameters, known as hyperparameters, to control the learning process. For example, hyperparameters may control constraints, weights, algorithms, learning rates, or other features associated with a machine learning model. The use of particular hyperparameters by a machine learning model may affect the machine learning model's performance. As such, before executing a machine learning model, hyperparameters for a machine learning model are typically first selected and tuned. Some current approaches for hyperparameter optimization include Manual Search, Grid Search, Random Search, and Bayesian Optimization.

Machine learning models are used across a variety of applications. For instance, machine learning models may be used determine search results in response to a search request. For example, at least some websites, such as retailer websites, allow a visitor to search for items. The website may include a search bar that allows the visitor to enter search terms, such as one or more words, that the website uses to search for items. In response to entering in the search terms, a computing device may execute a machine learning model to determine search results based on the entered search terms. The website may then display the search results, such as items for sale.

The relevancy of search results, however, is at least partially based on the performance of the executed machine learning model. For example, a machine learning model operating with more optimum hyperparameters may produce more relevant search results than another machine learning model operating with less optimum hyperparameters. As such, there are opportunities to improve hyperparameter optimization techniques when using machine learning models across a variety of applications, such as to determine search results.

SUMMARY

The embodiments described herein are directed to automatically determining hyperparameters for machine learning models. The apparatus and methods described herein may be applied to hyperparameter selection for machine learning models used across a variety of applications, such as to machine learning models that determine search results in response to a search request. The apparatus and methods described herein may improve upon current hyperparameter optimization techniques by identifying more optimum hyperparameters for a machine learning model. In some instances, the apparatus and methods described herein may allow for the consumption of less processing time to identify the hyperparameters for a machine learning model when compared to conventional techniques. Moreover, the apparatus and methods described herein may be resilient to variations in learning rates. For example, they may allow for higher performing (e.g., more accurate and precise) machine learning models across learning rates compared to conventional techniques.

When applied to a machine learning model used to identify search results, for example, the apparatus and methods may allow a retailer to present more relevant search results to a customer visiting a website. As a result, the customer's experience may be improved. For example, the customer may more quickly locate an item of interest, which may save the customer time as well as encourage the customer to purchase the item. In addition to or instead of these example advantages, persons of ordinary skill in the art would recognize and appreciate other advantages as well.

In accordance with various embodiments, exemplary systems may be implemented in any suitable hardware or hardware and software, such as in any suitable computing device. In some embodiments, a computing device configures a machine learning model with a first set of hyperparameters from a pool of hyperparameters. The computing device may execute the machine learning model to generate a validation score, and may update parameters of a probability determination model based on the validation score. Further, the computing device may execute the probability determination model to generate probabilities corresponding to the first set of hyperparameters. The computing device may also determine a second set of hyperparameters from the pool of hyperparameters based on the generated probabilities, and may configure the machine learning model with the second set of hyperparameters. The computing device may repeat the process of generating validation scores, updating the parameters, and generating probabilities to determine sets of hyperparameters until at least one condition is satisfied.

In some embodiments, a computing device is configured to configure a machine learning model with a first set of hyperparameters from a pool of hyperparameters. The computing device may also be configured to generate a first validation score based on execution of the machine learning model configured with the first set of hyperparameters. Further, the computing device may be configured to update parameters of a probability determination model based on the first validation score. The computing device may be configured to generate a first plurality of values corresponding to the first set of hyperparameters based on a first execution of the probability determination model. The computing device may further be configured to determine a second set of hyperparameters from the pool of hyperparameters based on the first plurality of values. The computing device may also be configured to configure the machine learning model with the second set of hyperparameters.

In some examples, the computing device may be configured to receive a search request and, in response to the search request, execute the machine learning model configured with the second set of hyperparameters to generate search results. The computing device may also be configured to transmit the search results.

In some embodiments, a method is provided that includes configuring a machine learning model with a first set of hyperparameters from a pool of hyperparameters. The method may also include generating a first validation score based on execution of the machine learning model configured with the first set of hyperparameters. Further, the method may include updating parameters of a probability determination model based on the first validation score. The method may further include generating a first plurality of values corresponding to the first set of hyperparameters based on a first execution of the probability determination model. The method may include determining a second set of hyperparameters from the pool of hyperparameters based on the first plurality of values. The method may also include configuring the machine learning model with the second set of hyperparameters.

In some examples, the method includes receiving a search request and, in response to the search request, executing the machine learning model configured with the second set of hyperparameters to generate search results. The method may also include transmitting the search results.

In yet other embodiments, a non-transitory computer readable medium has instructions stored thereon, where the instructions, when executed by at least one processor, cause a computing device to perform operations that include configuring a machine learning model with a first set of hyperparameters from a pool of hyperparameters. The operations may also include generating a first validation score based on execution of the machine learning model configured with the first set of hyperparameters. Further, the operations may include updating parameters of a probability determination model based on the first validation score. The operations may further include generating a first plurality of values corresponding to the first set of hyperparameters based on a first execution of the probability determination model. The operations may include determining a second set of hyperparameters from the pool of hyperparameters based on the first plurality of values. The operations may also include configuring the machine learning model with the second set of hyperparameters.

In some examples, the operations includes receiving a search request and, in response to the search request, executing the machine learning model configured with the second set of hyperparameters to generate search results. The operations may also include transmitting the search results.

BRIEF DESCRIPTION OF THE DRAWINGS

The features and advantages of the present disclosures will be more fully disclosed in, or rendered obvious by the following detailed descriptions of example embodiments. The detailed descriptions of the example embodiments are to be considered together with the accompanying drawings wherein like numbers refer to like parts and further wherein:

FIG. 4 is a block diagram illustrating examples of various portions of the hyperparameter determination computing device of FIG. 1 in accordance with some embodiments;

DETAILED DESCRIPTION

Figure 1:
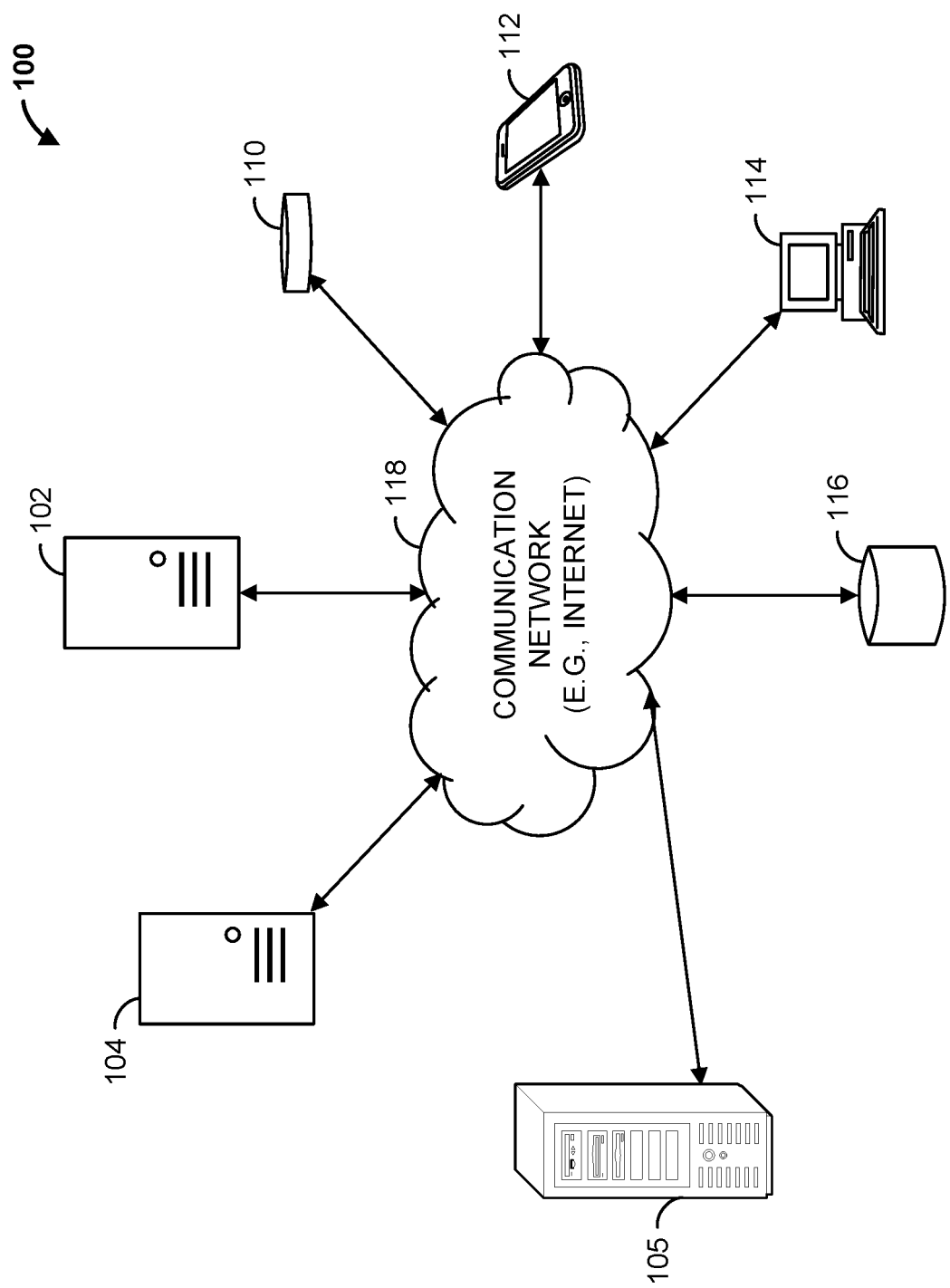
FIG. 1 is a block diagram of a hyperparameter determination computing device in a search result determination system in accordance with some embodiments.

The description of the preferred embodiments is intended to be read in connection with the accompanying drawings, which are to be considered part of the entire written description of these disclosures. While the present disclosure is susceptible to various modifications and alternative forms, specific embodiments are shown by way of example in the drawings and will be described in detail herein. The objectives and advantages of the claimed subject matter will become more apparent from the following detailed description of these exemplary embodiments in connection with the accompanying drawings.

It should be understood, however, that the present disclosure is not intended to be limited to the particular forms disclosed. Rather, the present disclosure covers all modifications, equivalents, and alternatives that fall within the spirit and scope of these exemplary embodiments. The terms "couple," "coupled," "operatively coupled," "operatively connected," and the like should be broadly understood to refer to connecting devices or components together either mechanically, electrically, wired, wirelessly, or otherwise, such that the connection allows the pertinent devices or components to operate (e.g., communicate) with each other as intended by virtue of that relationship.

Turning to the drawings, FIG. 1 illustrates a block diagram of a search result determination system 100 that includes a hyperparameter determination computing device 102 (e.g., a server, such as an application server), a web server 104, database 116, an item data update system 105, and multiple customer computing devices 110, 112, 114 operatively coupled over network 118. Hyperparameter determination computing device 102, server 104, item data update system 105, and multiple customer computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit data to, and receive data from, communication network 118.

In some examples, hyperparameter determination computing device 102 can be a computer, a workstation, a laptop, a server such as a cloud-based server, or any other suitable device. In some examples, each of multiple customer computing devices 110, 112, 114 can be a cellular phone, a smart phone, a tablet, a personal assistant device, a voice assistant device, a digital assistant, a laptop, a computer, or any other suitable device. In some examples, hyperparameter determination computing device 102 is operated by a retailer, and multiple customer computing devices 112, 114 are operated by customers of the retailer.

Although FIG. 1 illustrates three customer computing devices 110, 112, 114, search result determination system 100 can include any number of customer computing devices 110, 112, 114. Similarly, search result determination system 100 can include any number of hyperparameter determination computing devices 102, web servers 104, item data update systems 105, and databases 116.

In some examples, web server 104 hosts one or more web pages, such as a retailer's website. Web server 104 may transmit purchase data related to orders purchased on the website by customers to hyperparameter determination computing device 102. Web server 104 may also transmit a search request to hyperparameter determination computing device 102. The search request may identify a search query provided by a customer. In response to the search request, hyperparameter determination computing device 102 may execute a machine learning model (e.g., algorithm) to determine search results. The machine learning model may be any suitable machine learning model, such as one based on decision trees, linear regression, logistic regression, support-vector machine (SVM), K-Means, or a deep learning model such as a neural network. The machine learning model may execute with hyperparameters selected and tuned by hyperparameter determination computing devices 102, as described further below. Hyperparameter determination computing devices 102 may then transmit the search results to the web server 104. Web server 104 may display the search results on the website to the customer. For example, the search results may be displayed on a search results webpage in response to the search query entered by the customer.

First customer computing device 110, second customer computing device 112, and $N^{th}$ customer computing device 114 may communicate with web server 104 over communication network 118. For example, each of multiple computing devices 110, 112, 114 may be operable to view, access, and interact with a website hosted by web server 104. In some examples, web server 104 hosts a website for a retailer that allows for the purchase of items. The website may further allow a customer to search for items on the website via, for example, a search bar. A customer operating one of multiple computing devices 110, 112, 114 may access the website and perform a search for items on the website by entering in one or more terms into the search bar. In response, the website may return search results identifying one or more items, as described above and further herein. The website may allow the operator to add one or more of the items to an online shopping cart, and allow the customer to perform a "checkout" of the shopping cart to purchase the items.

Hyperparameter determination computing device 102 is further operable to communicate with database 116 over communication network 118. For example, hyperparameter determination computing device 102 can store data to, and read data from, database 116. Database 116 can be a remote storage device, such as a cloud-based server, a disk (e.g., a hard disk), a memory device on another application server, a networked computer, or any other suitable remote storage. Although shown remote to hyperparameter determination computing device 102, in some examples, database 116 can be a local storage device, such as a hard drive, a non-volatile memory, or a USB stick. Hyperparameter determination computing device 102 may store purchase data received from web server 104 in database 116. Hyperparameter determination computing device 102 may also store user session data identifying events associated with browsing sessions, such as data related to when a customer browses a website hosted by web server 104.

In some examples, database 116 stores one or more machine learning models that, when executed by hyperparameter determination computing device 102, allow hyperparameter determination computing device 102 to determine one or more search results in response to a search query. Further, in some examples, database 116 stores hyperparameters that the machine learning models may incorporate during execution. For example, database 116 may store a listing of possible hyperparameters that a particular machine learning model may employ. Each possible hyperparameter may be associated with a probability, as determined by hyperparameter determination computing device 102 and described further below. Hyperparameter determination computing device 102 may select one or more of the hyperparameters based on the probabilities, and may configure a machine learning model to use the selected one or more hyperparameters. Hyperparameter determination computing device 102 may then execute the machine learning model with the configured hyperparameters to generate search results based on one or more search terms.

Communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. Communication network 118 can provide access to, for example, the Internet.

Hyperparameter Determination

A machine learning model may be configured with (e.g., may support) various hyperparameters. For example, a machine learning model of a first type may be configurable with at least a subset of a first set of hyperparameters, and a machine learning model of a second type may be configurable with at least a subset of a second set of hyperparameters. The first set of hyperparameters and second set of hyperparameters may have overlapping hyperparameters.

Figure 5A:
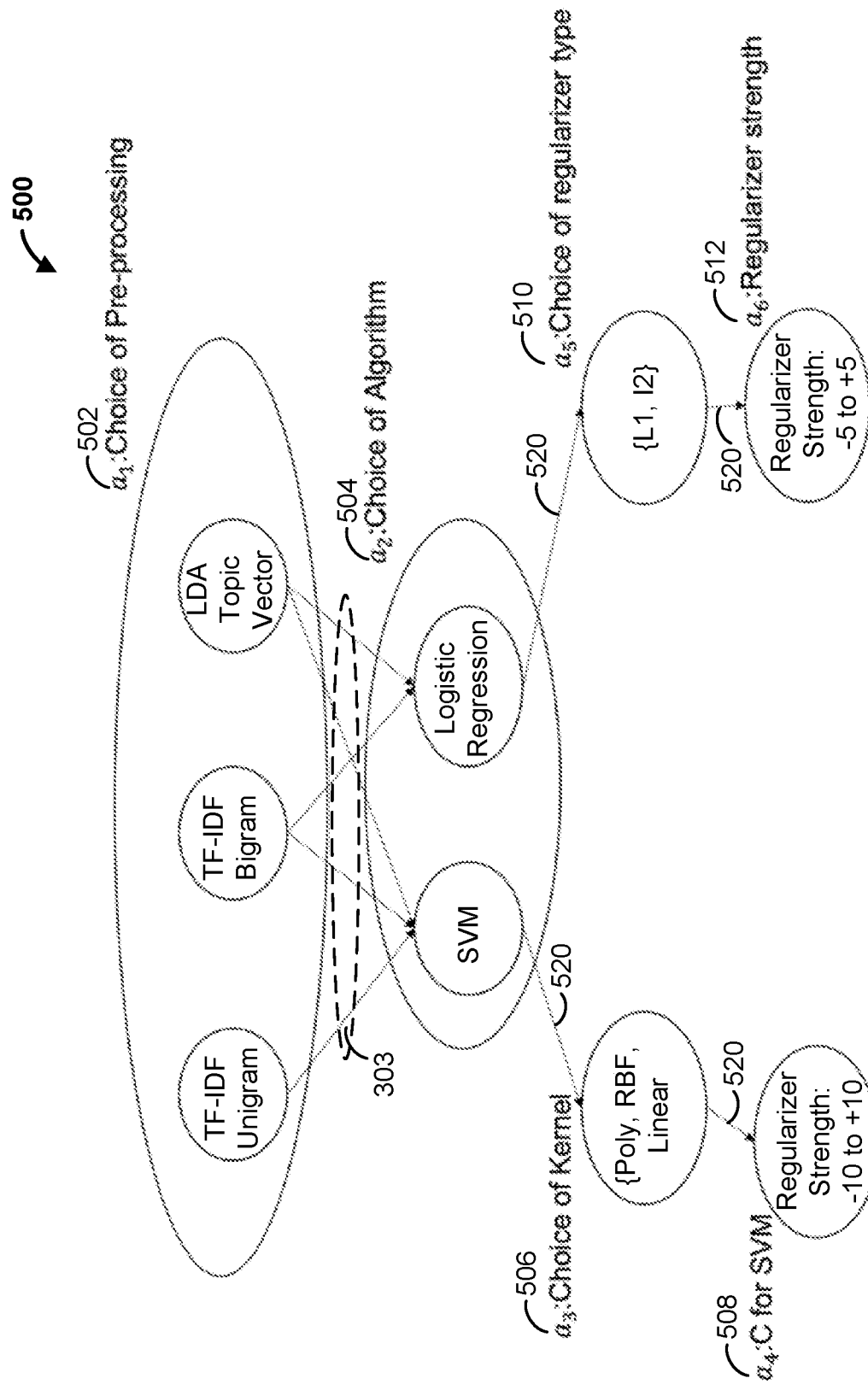
FIG. 5A illustrates exemplary hyperparameters in a search space in accordance with some embodiments.

For example, FIG. 5A illustrates a hyperparameter search space 500 that may be generated by hyperparameter determination computing device 102 and stored, for example, in database 116. Hyperparameter search space 500 includes various hyperparameter types 502, 504, 506, 508, 510, 512. For example, hyperparameter type $\alpha_1$ 502 illustrates exemplary pre-processing hyperparameters that one or more machine learning models may be configured with. Similarly, hyperparameter type $\alpha_2$ 504 illustrates exemplary algorithm hyperparameters, hyperparameter type $\alpha_3$ 506 illustrates exemplary kernel hyperparameters, and hyperparameter type $\alpha_4$ 508 illustrates exemplary SVM specific hyperparameters. Further, hyperparameter type $\alpha_5$ 510 illustrates exemplary regularizer type hyperparameters, and hyperparameter type $\alpha_6$ 512 illustrates exemplary regularizer strength hyperparameters. Each of the hyperparameter types 502, 504, 506, 508, 510, 512 includes one or more exemplary hyperparameter values.

Hyperparameter search space 500 is hierarchically organized, where edges 520 indicate possible selections of a lower-level hyperparameter type given the selection of a higher-level hyperparameter type. For example, assuming a selection of "TF-IDF Unigram" for hyperparameter type $\alpha_1$ 502, only a selection of "SVM" is available for hyperparameter type $\alpha_2$ 504. In contrast, assuming a selection of "TF-IDF Bigram" for hyperparameter type $\alpha_1$ 502, a selection of either "SVM" or "Logistic Regression" is available for hyperparameter type $\alpha_2$ 504. Similarly, assuming a selection of "SVM" for hyperparameter type $\alpha_2$, a selection of hyperparameter type $\alpha_3$ 506 is available. Otherwise, if "Logistic Regression" is selected for hyperparameter type $\alpha_2$, a selection of hyperparameter type $\alpha_5$ 510 is available.

In some examples, hyperparameter determination computing device 102 determines possible hyperparameters for a given machine learning model type based on hierarchical hyperparameter search space, such as hyperparameter search space 500.

Referring back to FIG. 1, in some examples, hyperparameter determination computing device 102 maps hyperparameters (e.g., hyperparameter types) to probabilities associated with values corresponding to learnable parameters (e.g., a parameter that can be learned by the machine learning model). For example, hyperparameter determination computing device 102 may map hyperparameters to probabilities based on the density estimation model model (e.g., equation) below:

$$P(\alpha_{1:n};\theta)=P(\alpha_1;\theta)P(\alpha_2|\alpha_1;\theta \ldots P(\alpha_n|\alpha_{1:n-1};\theta) \quad (\text{eq. 1})$$

where:
$\alpha_x$=hyperparameter type;
P=probability; and
$\theta$=set of learnable parameters.

To determine a set of hyperparameters for a machine learning model, hyperparameter determination computing device 102 may sample a set of hyperparameters to select a first subset of hyperparameters. Hyperparameter determination computing device 102 may then configure the machine learning model with the first subset of hyperparameters. Initially, the first subset of hyperparameters may be sampled randomly. As training of the density estimation model progresses, $\theta$ is updated such that those hyper-parameter values that are likely to yield a higher validation accuracy are more likely to be sampled.

Once configured, hyperparameter determination computing device 102 may train the machine learning model with training data. The training data may be stored in database 116, for example. Hyperparameter determination computing device 102 may then test the configured and trained machine learning model with a validation test. For example, hyperparameter determination computing device 102 may execute the trained machine learning model, which is configured with the first set of hyperparameters, to operate on validation data (e.g., supervised data). Execution of the machine learning model may generate output results (e.g., classified data). Hyperparameter determination computing device 102 may compare the output results to expected results (e.g., correct results, correct data) to generate a score (e.g., value). The score may be based on one or more of an accuracy and precision of the output results, for example. For instance, hyperparameter determination computing device 102 may generate an $F_1$ score based on the output results and the expected results. Hyperparameter determination computing device 102 may assign higher probabilities (e.g., as determined by equation 1) to hyperparameters (e.g., hyperparameter types) that yield higher performance (e.g., higher scores) on a validation test.

Further, hyperparameter determination computing device 102 may compute (e.g., update) values corresponding to learnable parameters (e.g., $\theta$) based on the generated scores. For example, hyperparameter determination computing device 102 may compute the values corresponding to learnable parameters according to the equation below.

$$\theta=\theta+\alpha\nabla J(\theta) \quad (\text{eq. 2})$$

where:
$J(\theta)$=objective function; and
$\alpha$=a coefficient (e.g., 0.9, 0.1, 0.01).

The value of the coefficient a may be predetermined (e.g., empirically), for example. In some examples, the objective function may be given by the equation below.

$$J(\theta)=\mathbb{E}_{p(\alpha_{1:n};\theta)}[f(\alpha_{1:n})] \quad (\text{eq. 3})$$

where:
$\mathbb{E}_p$=expectation of a function of hyper-parameters with respect to hyper-parameters sampled from the density estimation model; and
$f(\alpha_{1:n})$=an unknown (possibly stochastic) mapping from the hyper-parameter search space to a scalar quantity, such as the model's accuracy on a validation set.

In addition, in some examples, hyperparameter determination computing device 102 may compute the gradient of the objection function (e.g., $\nabla J(\theta)$) according to the equation below.

$$\nabla J(\theta)=\Sigma_{i=1}^n E_{p(\alpha_1,\alpha_2,\ldots,\alpha_n;\theta)}[\nabla_\theta \log P(\alpha_i|\alpha_{(i-1):1})f(\alpha_1, \alpha_2,\ldots,\alpha_n)] \quad (\text{eq. 4})$$

where:
n=number of hyperparameters.

Hyperparameter determination computing device 102 may, in some examples, estimate the gradient of the objection function (e.g., as given by equation 4) according to the equation below.

$$\nabla J(\theta) \approx \frac{1}{m}\sum_{k=1}^{m}\sum_{i=1}^{n}\left[\nabla_\theta \log P(a_i^k \mid a_{(i-1):1}^k;\theta)R_k\right] \quad (\text{eq. 5})$$

where:
m=batch size of hyper-parameter strings sampled;
n=number of hyperparameters; and
$R_k$=machine learning model's performance score on the $k^{th}$ sampled sequence of hyperparameters $\alpha_1^k, \alpha_2^k, \ldots, \alpha_n^k$.

After updating the values corresponding to learnable parameters (e.g., in accordance with equation 2), hyperparameter determination computing device 102 may determine the associated probabilities (e.g., in accordance with equation 1). Hyperparameter determination computing device 102 may then resample the set of hyperparameters to select a second subset of hyperparameters based on the probabilities. Hyperparameter determination computing device 102 may then reconfigure the machine learning model with the second set of parameters, retrain the machine learning model, and regenerate a score based on a validation set, as described above.

Hyperparameter determination computing device 102 may continue the above process until, for example, a generated score is beyond (e.g., above) a threshold (e.g., a predetermined threshold). In some examples, hyperparameter determination computing device 102 repeats the process for a number of iterations (e.g., a number of predetermined iterations). As training progresses, the hyper-parameter configuration that yields a best validation accuracy score is stored (e.g., cached and updated). At the end of training, the machine learning model is configured with this stored hyperparameter configuration. In some examples, the machine learning model is configured with the last selected subset of hyperparameters. In some examples, the machine learning model is configured with hyperparameters associated with the highest probabilities. In some examples, the machine learning model is configured with hyperparameters associated with the highest values corresponding to learnable parameters.

The above description refers to a machine learning model merely for convenience, and those of ordinary skill in the art having the benefit of these disclosures would appreciate that, in at least some examples, hyperparameter determination computing device 102 may determine hyperparameters for a plurality of machine learning models in accordance with the disclosures herein.

Figure 5B:
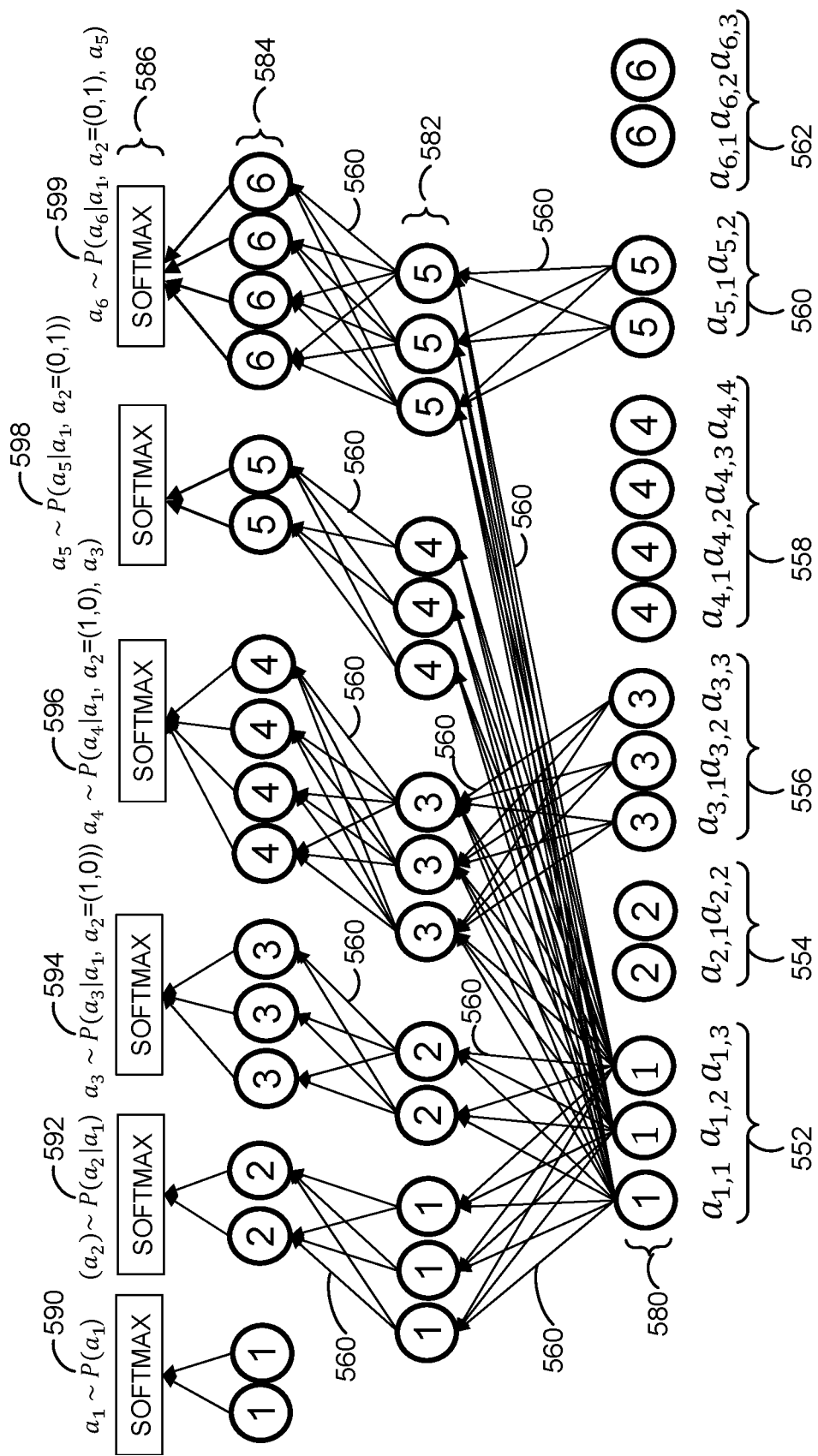
FIG. 5B illustrates an exemplary probability determination model in accordance with some embodiments.

FIG. 5B illustrates a probability determination model 550 with conditional probabilities for the hyperparameter types 502, 504, 506, 508, 510, 512 of FIG. 5A. In this example, probability determination model 550 is in the form a neural network with a first layer 580, a second layer 582, a third layer 584, and a fourth layer 586. In other examples, probability determination model 550 may be based on any other type of machine learning model, such as any other type of deep learning model, or a machine learning model based on decision trees, linear regression, logistic regression, SVM, or K-Means, for example.

First layer 580 may be an input layer, second layer 582 and third layer 584 may be hidden layers, and fourth layer 586 may be an output layer, for example. The output of the fourth layer 586 may be probabilities for each hyperparameter type 502, 504, 506, 508, 510, 512 (e.g., as determined by equation 1 above). For example, first probability 590 specifies a probability (e.g., probability value) for hyperparameter type $\alpha_1$ 502. Similarly, second probability 592 specifies a probability for hyperparameter type $\alpha_2$ 504, third probability 594 specifies a probability for hyperparameter type $\alpha_3$ 506, and fourth probability 596 specifies a probability for hyperparameter type $\alpha_4$. Further, fifth probability 598 specifies a probability for hyperparameter type $\alpha_5$ 510, and sixth probability 599 specifies a probability for hyperparameter type $\alpha_6$ 512.

Fourth layer 586 may, in some examples, normalize its inputs (i.e., the outputs from the third layer 584) to generate the probabilities. In this example, fourth layer 586 includes a "softmax" function to determine the probabilities based on corresponding inputs as received from the third layer 584.

Probability determination model 550 further illustrates hyperparameter values for each hyperparameter type 502, 504, 506, 508, 510, 512. The hyperparameter values correspond to the hyperparameter values illustrated for each hyperparameter type 502, 504, 506, 508, 510, 512 of FIG. 5A. For example, probability determination model 550 illustrates first hyperparameter values 552 for hyperparameter type $\alpha_1$ 502, second hyperparameter values 554 for hyperparameter type 60 $_2$ 504, and third hyperparameter values 556 for hyperparameter type $\alpha_3$ 506. Further, probability determination model 550 illustrates fourth hyperparameter values 558 for hyperparameter type $\alpha_4$, fifth hyperparameter values 560 for hyperparameter type $\alpha_5$ 510, and sixth hyperparameter values 562 for hyperparameter type $\alpha_6$ 512.

Probability determination model 550 also illustrates edges 560, which indicate a dependency from one layer to the next. Each edge may be associated with a value (e.g., weight) corresponding to a learnable parameter (e.g., θ). The values may be determined according to equation 2 above, for example.

As an example, first probability 590 (corresponding to hyperparameter type $\alpha_1$) for first hyperparameter values 552 is based only on a selected first hyperparameter value 552, with no dependency on any of the other hyperparameter types. Second probability 592 for second hyperparameter values 554, however, is dependent on first hyperparameter values 552. Third probability 594 for third hyperparameter values 556 are also dependent on first hyperparameter values 552, but further require a selection of "SVM," and no selection of "Logistics Regression," for hyperparameter type $\alpha_2$ 504 (as illustrated by $\alpha_2$=(1, 0)). Because a particular selection for hyperparameter type $\alpha_2$ 504 is required, third probability 594 shows no dependency from second hyperparameter values 554.

Fourth probability 596 for fourth hyperparameter values 558 are dependent on first hyperparameter values 552 and third hyperparameter values 556, also require a selection of "SVM," and no selection of "Logistics Regression," for hyperparameter type $\alpha_2$ 504 (as illustrated by $\alpha_2$=(1, 0)). Because a particular selection for hyperparameter type $\alpha_2$ 504 is required, fourth probability 596 shows no dependency from second hyperparameter values 554.

Fifth probability 598 for fifth hyperparameter values 560 are dependent on first hyperparameter values 552, but further require a selection of "Logistics Regression," and no selection of "SVM," for hyperparameter type $\alpha_2$ 504 (as illustrated by $\alpha_2$=(0, 1)). Because a particular selection for hyperparameter type $\alpha_2$ 504 is required, fifth probability 598 shows no dependency from second hyperparameter values 554.

Finally, sixth probability 599 for sixth hyperparameter values 562 are dependent on first hyperparameter values 552 and fifth hyperparameter values 560, but further require a selection of "Logistics Regression," and no selection of "SVM," for hyperparameter type $\alpha_2$ 504 (as illustrated by $\alpha_2$=(0, 1)). Because a particular selection for hyperparameter type $\alpha_2$ 504 is required, fifth probability 598 shows no dependency from second hyperparameter values 554.

Search Request Example

Hyperparameter determination computing device 102 may receive a search request for a website from web server 104. The search request may identify a search query provided by a customer (e.g., via a search bar on the website). In some examples, hyperparameter determination computing device 102 may execute a trained machine learning model based on the search query to determine search results. The trained machine learning model may be configured with hyperparameters that were determined as described above. In some examples, the search results identify items for sale on the website.

Figure 2:
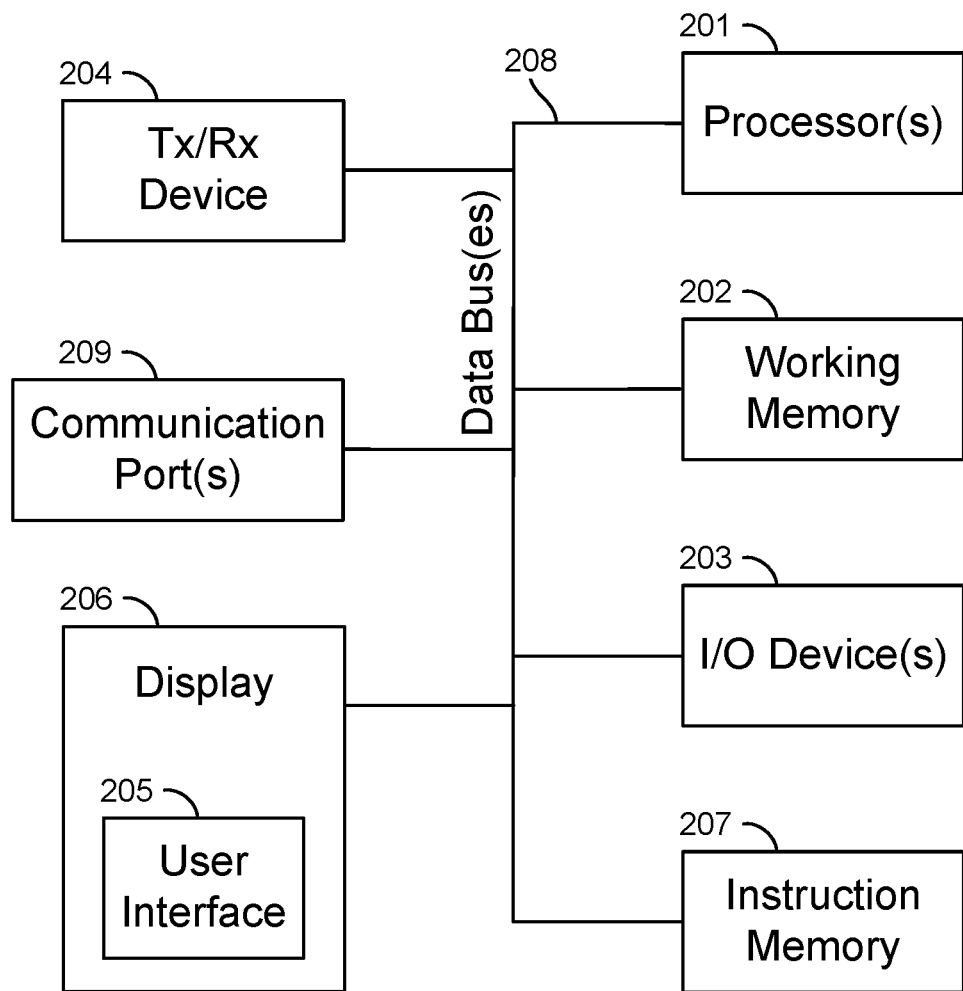
FIG. 2 is a block diagram of the hyperparameter determination computing device of FIG. 1 in accordance with some embodiments.

FIG. 2 illustrates the hyperparameter determination computing device 102 of FIG. 1. Hyperparameter determination computing device 102 can include one or more processors 201, working memory 202, one or more input/output devices 203, instruction memory 207, a transceiver 204, one or more communication ports 207, and a display 206, all operatively coupled to one or more data buses 208. Data buses 208 allow for communication among the various devices. Data buses 208 can include wired, or wireless, communication channels.

Processors 201 can include one or more distinct processors, each having one or more cores. Each of the distinct processors can have the same or different structure. Processors 201 can include one or more central processing units (CPUs), one or more graphics processing units (GPUs), application specific integrated circuits (ASICs), digital signal processors (DSPs), and the like.

Instruction memory 207 can store instructions that can be accessed (e.g., read) and executed by processors 201. For example, instruction memory 207 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. Processors 201 can be configured to perform a certain function or operation by executing code, stored on instruction memory 207, embodying the function or operation. For example, processors 201 can be configured to execute code stored in instruction memory 207 to perform one or more of any function, method, or operation disclosed herein.

Additionally processors 201 can store data to, and read data from, working memory 202. For example, processors 201 can store a working set of instructions to working memory 202, such as instructions loaded from instruction memory 207. Processors 201 can also use working memory 202 to store dynamic data created during the operation of hyperparameter determination computing device 102. Working memory 202 can be a random access memory (RAM) such as a static random access memory (SRAM) or dynamic random access memory (DRAM), or any other suitable memory.

Input-output devices 203 can include any suitable device that allows for data input or output. For example, input-output devices 203 can include one or more of a keyboard, a touchpad, a mouse, a stylus, a touchscreen, a physical button, a speaker, a microphone, or any other suitable input or output device.

Communication port(s) 209 can include, for example, a serial port such as a universal asynchronous receiver/transmitter (UART) connection, a Universal Serial Bus (USB) connection, or any other suitable communication port or connection. In some examples, communication port(s) 209 allows for the programming of executable instructions in instruction memory 207. In some examples, communication port(s) 209 allow for the transfer (e.g., uploading or downloading) of data, such as hyperparameter data.

Display 206 can display user interface 205. User interfaces 205 can enable user interaction with hyperparameter determination computing device 102. For example, user interface 205 can be a user interface for an application of a retailer that allows a customer to view and interact with a retailer's website. In some examples, a user can interact with user interface 205 by engaging input-output devices 203. In some examples, display 206 can be a touchscreen, where user interface 205 is displayed on the touchscreen.

Transceiver 204 allows for communication with a network, such as the communication network 118 of FIG. 1. For example, if communication network 118 of FIG. 1 is a cellular network, transceiver 204 is configured to allow communications with the cellular network. In some examples, transceiver 204 is selected based on the type of communication network 118 hyperparameter determination computing device 102 will be operating in. Processor(s) 201 is operable to receive data from, or send data to, a network, such as communication network 118 of FIG. 1, via transceiver 204.

Figure 3:
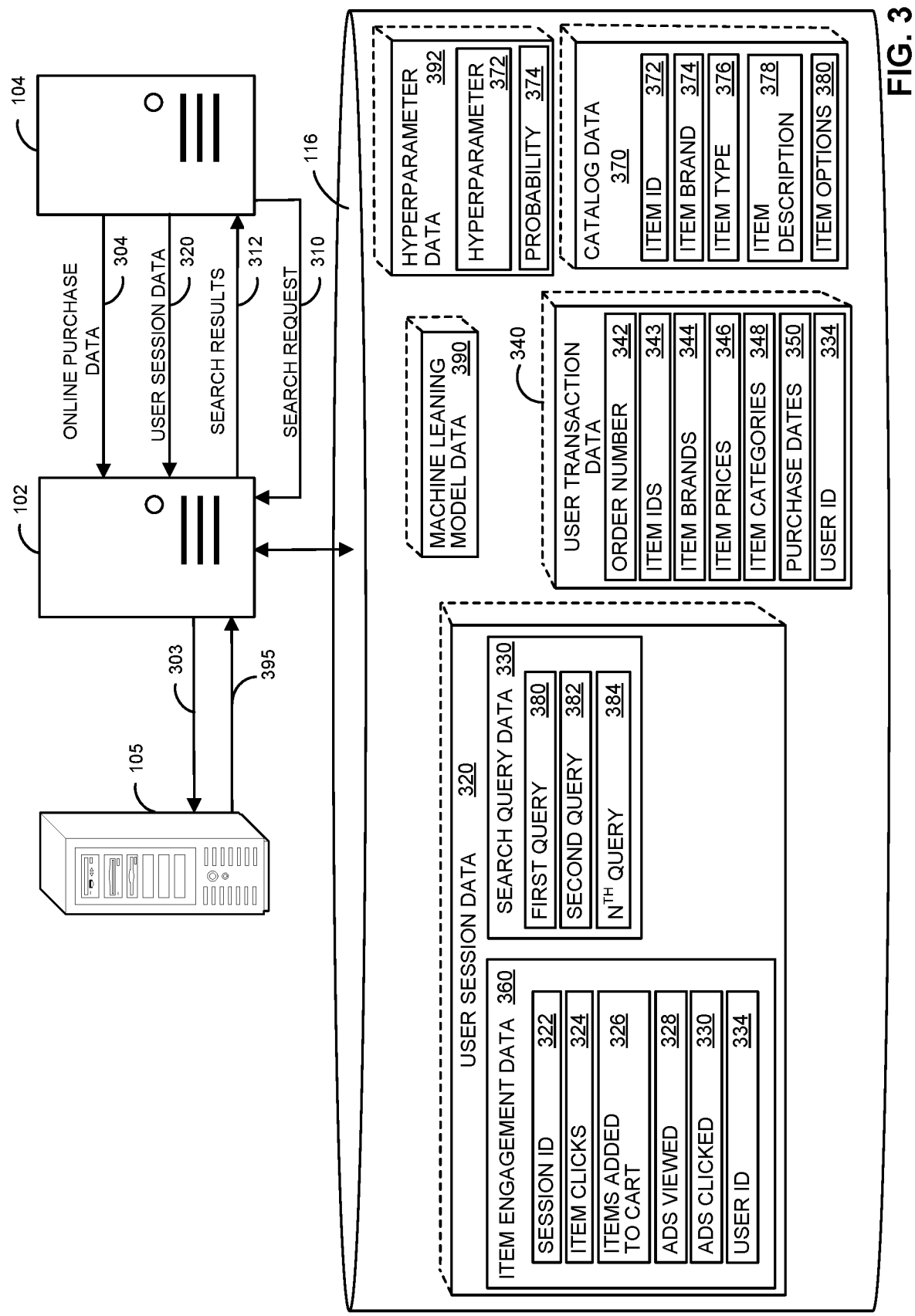
FIG. 3 is a block diagram illustrating examples of various portions of the search result determination system of FIG. 1 in accordance with some embodiments.

FIG. 3 is a block diagram illustrating examples of various portions of the search result determination system 100 of FIG. 1. As indicated in the figure, hyperparameter determination computing device 102 may receive user session data 320 from web server 104, and store user session data 320 in database 116. User session data 320 identifies, for each user, data related to a browsing session, such as when browsing a retailer's webpage hosted by web server 104. In this example, user session data 320 includes item engagement data 360 and search query data 330. Item engagement data 360 may include one or more of a session ID 322 (i.e., a website browsing session identifier), item clicks 324 identifying items which the user clicked (e.g., images of items for purchase, keywords to filter reviews for an item), items added-to-cart 326 identifying items added to the user's online shopping cart, advertisements viewed 328 identifying advertisements the user viewed during the browsing session, advertisements clicked 330 identifying advertisements the user clicked on, and user ID 334 ID (e.g., a customer ID, retailer website login ID, etc.). Search query data 330 may identify one or more searches conducted by a user during a browsing session (e.g., a current browsing session). In this example, search query data 330 includes first query 380, second query 382, and $N^{th}$ query 384.

Hyperparameter determination computing device 102 may also receive online purchase data 304 from web server 104, which identifies and characterizes one or more online purchases, such as from a retailer's website. Hyperparameter determination computing device 102 may parse in-store purchase data 302 and online purchase data 304 to generate user transaction data 340. In this example, user transaction data 340 may include, for each purchase, one or more of an order number 342 identifying a purchase order, item IDs 343 identifying one or more items purchased in the purchase order, item brands 344 identifying a brand for each item purchased, item prices 346 identifying the price of each item purchased, item category 348 identifying a category of each item purchased, a purchase date 350 identifying the purchase date of the purchase order, and user ID 334 for the user making the corresponding purchase.

Database 116 may further store catalog data 370, which may identify one or more attributes of a plurality of items, such as a portion of or all items a retailer carries. Catalog data 370 may identify, for each of the plurality of items, an item ID 372 (e.g., an SKU number), item brand 374, item type 376 (e.g., grocery item such as milk, clothing item), item description 378 (e.g., a description of the product including product features, such as ingredients, benefits, use or consumption instructions, or any other suitable description), and item options 380 (e.g., item colors, sizes, flavors, etc.).

Database 116 may also store machine learning model data 390 identifying and characterizing one or more machine learning models. Database 116 may further store hyperparameter data 392, which may identify a search space, such as search space 500. The search space may include a plurality of hyperparameter types and corresponding hyperparameter values 393 for each hyperparameter type. Hyperparameter determination computing device 102 may determine hyperparameters 393 for one or more of the machine learning models identified by machine learning model data 390.

For example, hyperparameter determination computing device 102 may sample a set of hyperparameters from hyperparameter data 392 to select a first subset of hyperparameters. Hyperparameter determination computing device 102 may then configure a machine learning model (e.g., identified by machine learning model data 390) with the first subset of hyperparameters, and train the machine learning model. Hyperparameter determination computing device 102 may train the machine learning model with, for example, one or more of user session data 320, user transaction data 340, and catalog data 310.

Further, hyperparameter determination computing device 102 may execute the trained machine learning model, which is configured with the first set of hyperparameters, to operate on validation data. Hyperparameter determination computing device 102 may compare the output results of the executed machine learning model to expected results to generate a score. The score may be based on one or more of an accuracy and precision of the output results, for example. Further, hyperparameter determination computing device 102 may compute values corresponding to learnable parameters of the machine learning model (e.g., θ) based on the generated scores. For example, hyperparameter determination computing device 102 may compute the values in accordance with equation 2 above.

After computing the values, hyperparameter determination computing device 102 may determine associated probabilities 394 (e.g., in accordance with equation 1). Hyperparameter determination computing device 102 may then resample the set of hyperparameters to select a second subset of hyperparameters based on the probabilities 394. Hyperparameter determination computing device 102 may reconfigure the machine learning model with the second set of parameters, retrain the machine learning model, and regenerate a score based on the validation set. Hyperparameter determination computing device 102 may continue the above process until, for example, a generated score is beyond (e.g., above) a threshold, a certain number of iterations, or for a predetermined amount of time. Once complete, the learning model may be configured with an optimal set of hyperparameters.

In some examples, hyperparameter determination computing device 102 may receive a search request 310 identifying and characterizing a search query for a user. The search query may include data identifying and characterizing one or more words, for example. In response to the search request 310, hyperparameter determination computing device 102 may execute a trained machine learning model that has been configured with hyperparameters as described above. Based on execution of the trained machine learning model, hyperparameter determination computing device 102 may determine search results 312 for the search query. The search results may identify, for example, such one or more recommended items. Hyperparameter determination computing device 102 may transmit the search results 312 to web server 104. Web server 104 may display the search results 312 on a webpage, such as a search results webpage.

In some examples, item data update system 105 provides catalog data update 395 to hyperparameter determination computing device 102. For instance, item data update system 105 may provide catalog data update 395 in response to a catalog data update request 303. Catalog data update 395 may identify one or more updates, changes, additions of new items, removal of items, or any other data related to catalog data 370. Hyperparameter determination computing device 102 may update catalog data 370 based on catalog data update 395.

In some examples, hyperparameter determination computing device 102 may execute a first trained machine learning model to identify "tags" within catalog data 370. The tags may be used as inputs to a second trained machine learning model to identify search results in response to a search request 310. Each of the first trained machine learning model and second trained machine learning model may be configured with hyperparameters as described herein.

FIG. 4 illustrates further exemplary portions of the hyperparameter determination computing device 102 of FIG. 1. Specifically, FIG. 4 illustrates the determination of hyperparameters (e.g., hyperparameter types) for configuring one or more machine learning models. As indicated in FIG. 4, hyperparameter determination computing device 102 includes hyperparameter sampling engine 402, model training engine 404, model validation engine 406, and hyperparameter probability determination engine 408. In some examples, one or more of hyperparameter sampling engine 402, model training engine 404, model validation engine 406, and hyperparameter probability determination engine 408 may be implemented in hardware. In some examples, one or more of hyperparameter sampling engine 402, model training engine 404, model validation engine 406, and hyperparameter probability determination engine 408 may be implemented as an executable program maintained in a tangible, non-transitory memory, such as instruction memory 207 of FIG. 2, that may be executed by one or processors, such as processor 201 of FIG. 2.

In this example, hyperparameter sampling engine 402 is configured to determine a hyperparameter set 403 comprising at least a portion of hyperparameters 393 from database 116. Hyperparameter sampling engine 402 may determine the hyperparameter set 403 based on, for example, corresponding probabilities 394. Hyperparameter sampling engine 402 may provide the hyperparameter set 403 to model training engine 404.

Model training engine 404 is configured to train one or more machine learning models, such as a machine learning model identified by machine learning model data 390. For example, model training engine 404 may obtain a machine learning model from machine learning model data 390 stored in database 116, and train the machine learning model with one or more of user session data 320, user transaction data 340, and catalog data 370. Model training engine 404 may provide the trained machine learning model 405 to model validation engine 406.

Model validation engine 406 may execute the trained machine learning model 405 to determine a validation score 407. For example, model validation engine 406 may provide validation data as input to the trained machine learning model 405, and execute the trained machine learning model 405 to generate output results. Model validation engine 406 may then compare the output results to expected results (e.g., which may be stored in database 116), and determine the validation score 407 based on the comparison. For example, the validation score 407 may be an $F_1$ score based on the output results and the expected results. Model validation engine 406 may provide the validation score 407 to hyperparameter probability determination engine 408.

Based on the validation score 407, hyperparameter probability determination engine 408 may determine one or more probabilities 394 for one or more hyperparameters 393. For example, hyperparameter probability determination engine 408 may determine values corresponding to learnable parameters (e.g., θ), such as based on equation 2 above. Hyperparameter probability determination engine 408 may compute the objection function according to equation 3, and may compute the gradient of the objection function based on the validation scores 407, such as according to equation 5.

Hyperparameter probability determination engine 408 may execute a probability determination model, such as probability determination model 550, to determine the probabilities 394 based on the updated values. For example, hyperparameter probability determination engine 408 may compute the probabilities 394 according to equation 1 above. As a result, hyperparameter probability determination engine 408 may assign higher probabilities 394 to hyperparameters (e.g., hyperparameter types) that yield higher validation scores 407. Hyperparameter probability determination engine 408 may store and/or update the probabilities 394 in database 116.

Hyperparameter sampling engine 402 may then resample the hyperparameters 393 based on the updated probabilities 394, to continue refining the machine learning model in accordance with the above process until a final set of hyperparameters have been determined. For example, hyperparameter determination computing device 102 may continue the above process until one or more conditions are satisfied. A condition may include, for example, a validation score 407 above a threshold, a certain number of iterations have been executed, or a predetermined amount of time (e.g., processing time) has passed.

Figure 6:
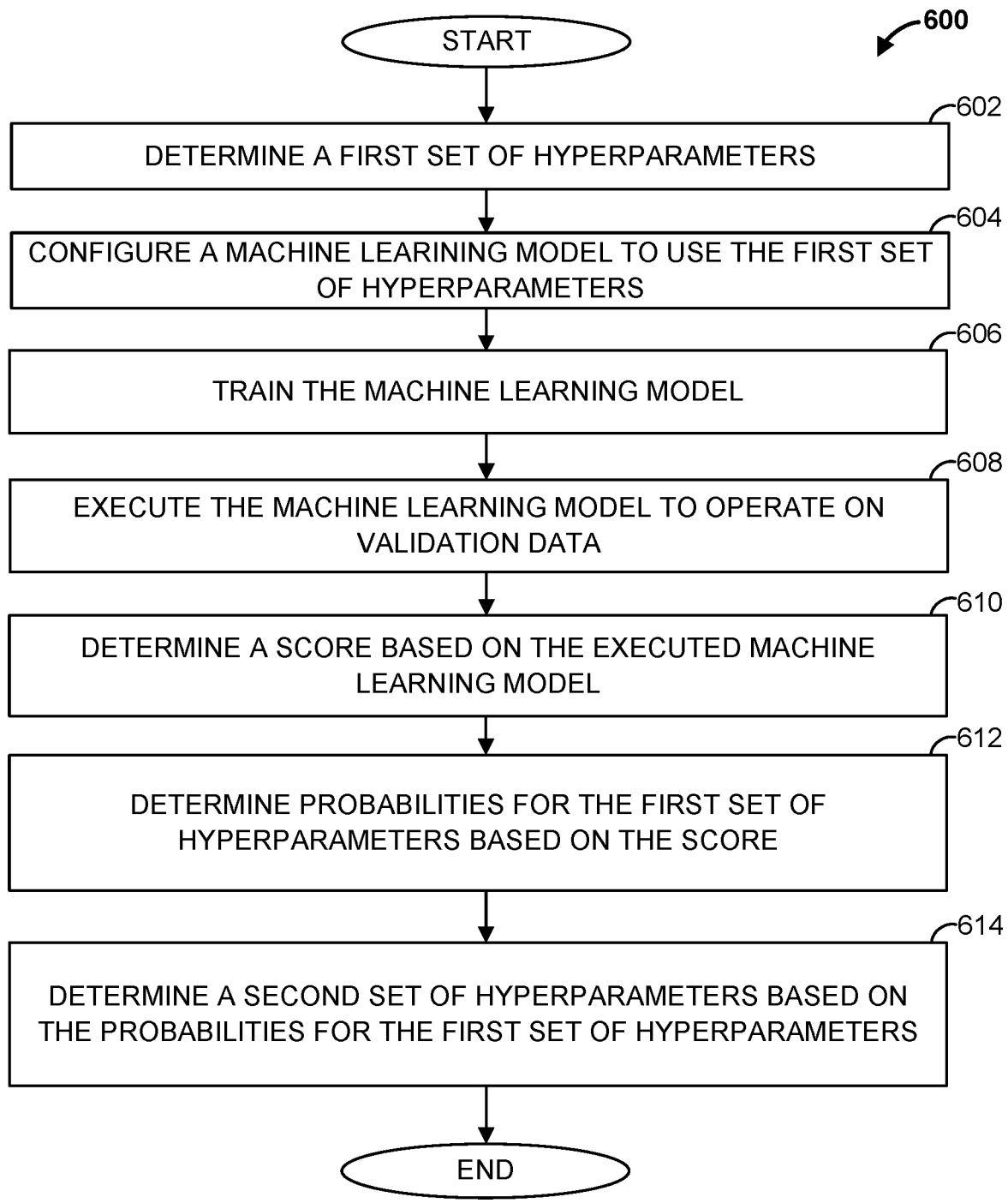
FIG. 6 is a flowchart of an example method that can be carried out by the hyperparameter determination computing device of FIG. 1 in accordance with some embodiments.

FIG. 6 is a flowchart of an example method 600 that can be carried out by a computing device, such as the hyperparameter determination computing device 102 of FIG. 1. Beginning at step 602, a first set of hyperparameters is determined. For example, hyperparameter determination computing device 102 may sample hyperparameter data 392 to determine a first set of hyperparameter 393. At step 604, a machine learning model is configured to use the first set of hyperparameters. For example, hyperparameter determination computing device 102 may configure a machine learning model identified by machine learning model data 390 with the first set of hyperparameters. At step 606, the machine learning model is trained. For example, the machine learning model may be trained with user session data 320 and user transaction data 340 to generate search results based on a search request 310.

Proceeding to step 608, the machine learning model is executed to operate on validation data. The validation data may be test data, such as supervised data. At step 610, a score is determined based on the executed machine learning model. For example, a validation score 407 may be generated based on the output results of the executed machine learning model and expected (e.g., correct) results. In some examples, the score is computed based on an $F_1$ function that computes $F_1$ scores.

At step 612, probabilities for the first set of hyperparameters are determined based on the score. For example, hyperparameter determination computing device 102 may determine probabilities 394 based on values corresponding to learnable parameters of the executed machine learning model. As an example, hyperparameter determination computing device 102 may compute values corresponding to learnable parameters of the executed machine learning model in accordance with equation 2 above. Hyperparameter determination computing device 102 may then compute the probabilities based on the computed values, for example, in accordance with equation 1 above.

Proceeding to step 614, a second set of hyperparameters may be determined based on the probabilities for the first set of hyperparameters. For example, hyperparameter determination computing device 102 may execute an algorithm to identify a plurality of the hyperparameters based on their corresponding probabilities. In some examples, hyperparameter determination computing device 102 may receive input data, and execute the machine learning model, configured to use the second set of hyperparameters, to generate output data. The method then ends.

Figure 7:
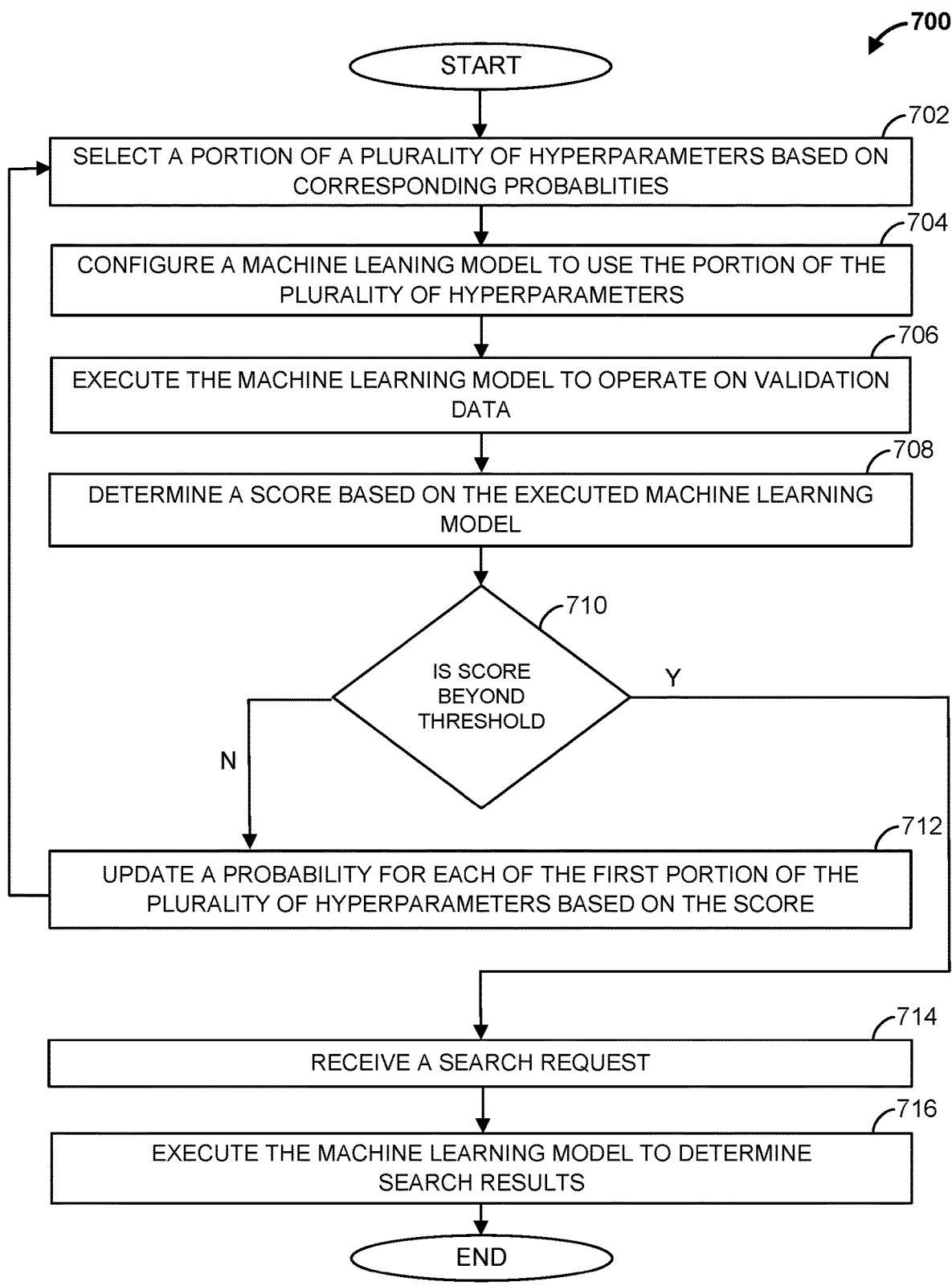
FIG. 7 is a flowchart of another example method that can be carried out by the hyperparameter determination computing device of FIG. 1 in accordance with some embodiments.

FIG. 7 is a flowchart of an example method 700 that can be carried out by a computing device, such as the hyperparameter determination computing device 102 of FIG. 1. At step 702, a portion of a plurality of hyperparameters are selected based on corresponding probabilities. For example, hyperparameter determination computing device 102 may execute a probability determination model, such as probability determination model 550, which generates probabilities. In some examples, the probability determination model is based on a neural network that comprises weighted edges between layers. At step 704, a machine learning model is configured to use the portion of the plurality of hyperparameters.

Proceeding to step 706, the machine learning model is executed to operate on validation data. The validation data may be, for example, test data used for testing the machine learning model. At step 708, a score is determined based on the executed machine learning model. For example, hyperparameter determination computing device 102 may generate a validation score 407 based on the output results and expected results of the executed machine learning model.

At step 710, a determination is made as to whether the determined score is beyond a threshold. For example, hyperparameter determination computing device 102 may determine whether the determined score is at or above a predetermined threshold. The predetermined threshold may be stored in a storage medium, such as in database 116. If the score is not beyond the threshold, the method proceeds back to step 702, where another portion of the plurality of hyperparameters is selected. Otherwise, if the score is beyond the threshold, the method proceeds to step 714.

At step 714, a search request is received. For example, hyperparameter determination computing device 102 may receive a search request 310 from web server 104. At step 716, the machine learning model is executed to determine search results. For example, in response to the search request 310, hyperparameter determination computing device 102 may execute a machine learning model that has been configured with hyperparameters as described above with respect to steps 702 through 712 to generate search results 312. In some examples, hyperparameter determination computing device 102 transmits the search results 312 to web server 104. Web server 104 may then display the search results to the user. The method then ends.

Figure 8:
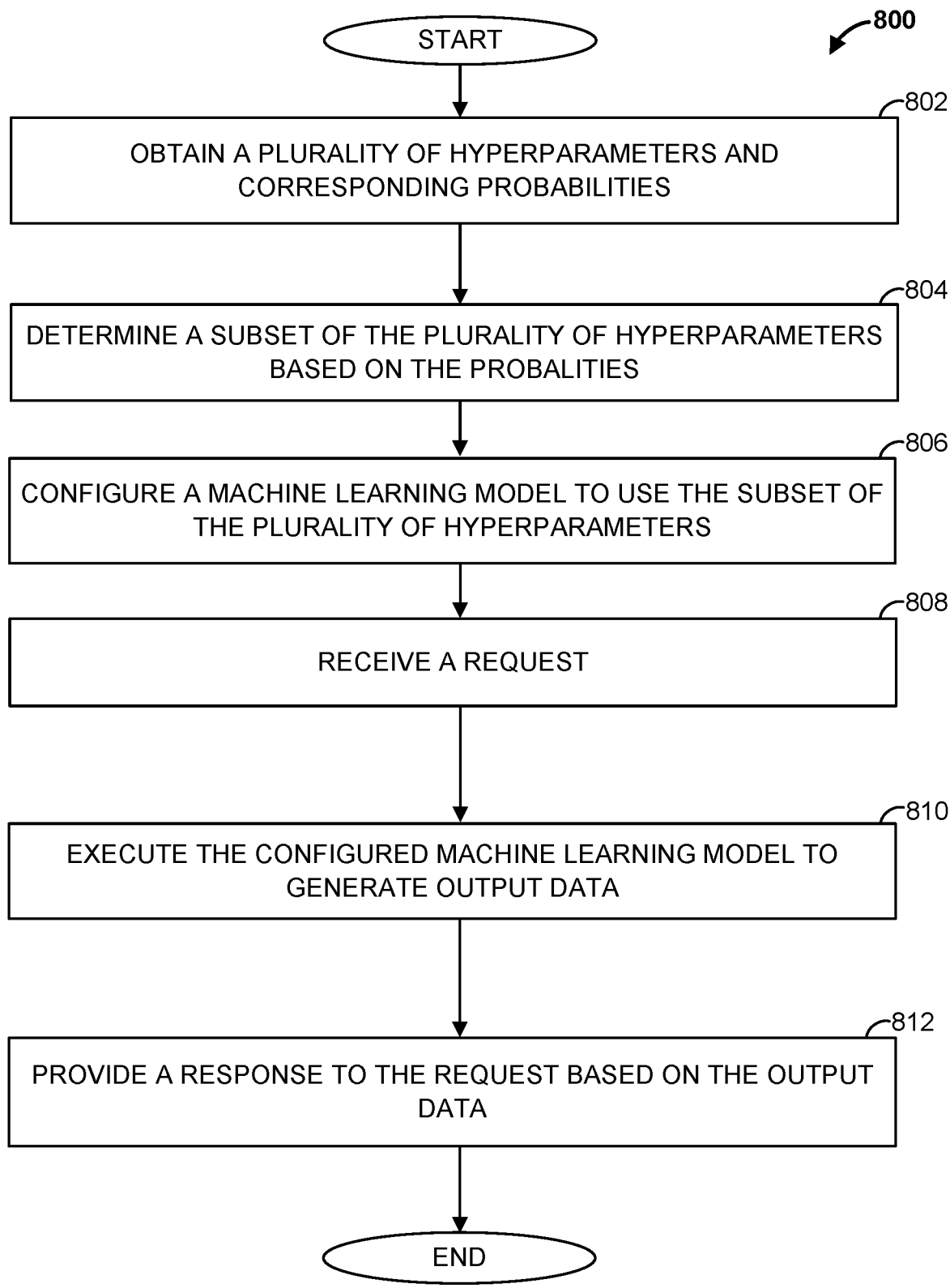
FIG. 8 is a flowchart of another example method that can be carried out by the hyperparameter determination computing device of FIG. 1 in accordance with some embodiments.

FIG. 8 is a flowchart of an example method 800 that can be carried out by a computing device, such as the hyperparameter determination computing device 102 of FIG. 1. Beginning at step 802, a plurality of hyperparameters and corresponding probabilities are obtained (e.g., from a database, such as database 116). At step 804, a subset of the plurality of hyperparameters are determined based on the probabilities. For example, hyperparameter determination computing device 102 may execute an algorithm that operates on the probabilities to determine the hyperparameters. In some examples, the algorithm is more likely to select hyperparameters associated with higher probabilities than hyperparameters with relatively lower probabilities.

Proceeding to step 806, a machine learning model is configured to use the subset of the plurality of hyperparameters. At step 808, a request is received. For example, hyperparameter determination computing device 102 may receive a search request 310. At step 810, the configured machine learning model is executed to generate output data. For example, hyperparameter determination computing device 102 may execute the machine learning model to generate search results 312. At step 812, a response is provided to the request based on the output data. For example, in response to the search request 310, hyperparameter determination computing device 102 may generate and provide (e.g., transmit) search results 312. The method then ends.

Figure 9:
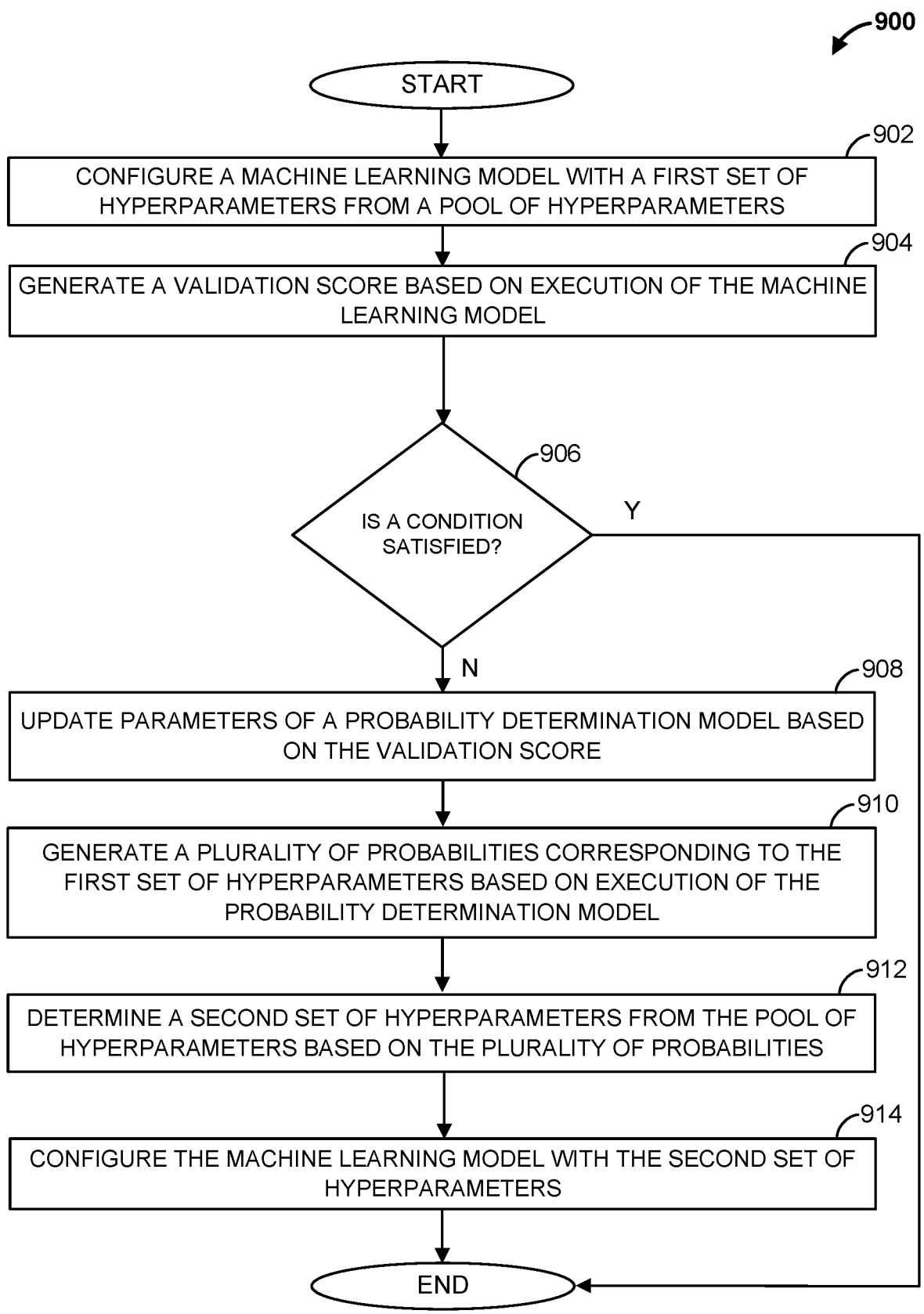
FIG. 9 is a flowchart of another example method that can be carried out by the hyperparameter determination computing device of FIG. 1 in accordance with some embodiments.

FIG. 9 is a flowchart of an example method 900 that can be carried out by a computing device, such as the hyperparameter determination computing device 102 of FIG. 1. Beginning at step 902, a machine learning model is configured with a first set of hyperparameters from a pool of hyperparameters. For example, hyperparameter determination computing device 102 may obtain a machine learning model from machine learning model data 390 stored in database 116, and configure the machine learning model with hyperparameters 393 of hyperparameter data 392 also stored in database 116. At step 904, a validation score is generated based on execution of the machine learning model. For example, hyperparameter determination computing device 102 may generate an Fi score based on output results of the executed machine learning model and expected results.

At step 906, a determination is made as to whether a condition is satisfied. For example, the condition may be based on whether the validation score is above a threshold, whether the machine learning model has been configured with hyperparameters a certain number of times, or whether a predetermined amount of time has passed since the machine learning model was configured with the first set of hyperparameters. If the condition has not been satisfied, the method proceeds to step 908. Otherwise, if the condition is satisfied, the method ends.

At step 908, parameters of a probability determination model are updated based on the validation score. For example, hyperparameter determination computing device 102 may update parameters (e.g., θ) of probability determination model 550 based on equation 2.

Proceeding to step 910, a plurality of probabilities are generated based on execution of the probability determination model. The probabilities correspond to the first set of hyperparameters. For example, hyperparameter determination computing device 102 may generate the probabilities based on execution of probability determination model 550. At step 912, a second set of hyperparameters from the pool of hyperparameters are determined based on the plurality of probabilities. At step 914, the machine learning model is configured with the second set of hyperparameters. The method then proceeds back to step 906, where a determination is made as to whether the condition is now satisfied.

Although the methods described above are with reference to the illustrated flowcharts, it will be appreciated that many other ways of performing the acts associated with the methods can be used. For example, the order of some operations may be changed, and some of the operations described may be optional.

In addition, the methods and system described herein can be at least partially embodied in the form of computer-implemented processes and apparatus for practicing those processes. The disclosed methods may also be at least partially embodied in the form of tangible, non-transitory machine-readable storage media encoded with computer program code. For example, the steps of the methods can be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, the computer program code segments configure the processor to create specific logic circuits. The methods may alternatively be at least partially embodied in application specific integrated circuits for performing the methods.

The foregoing is provided for purposes of illustrating, explaining, and describing embodiments of these disclosures. Modifications and adaptations to these embodiments will be apparent to those skilled in the art and may be made without departing from the scope or spirit of these disclosures.

What is claimed is:
1. A system comprising:
a computing device configured to:
  configure a machine learning model with a first set of hyperparameters from a pool of hyperparameters;
  generate a first validation score based on execution of the machine learning model configured with the first set of hyperparameters;
  update parameters of a probability determination model based on the first validation score;
  generate a first plurality of values corresponding to the first set of hyperparameters based on a first execution of the probability determination model;
  determine a second set of hyperparameters from the pool of hyperparameters based on the first plurality of values;
  configure the machine learning model with the second set of hyperparameters;
  receive a search request comprising a search query from a web server;
  determine search results based on executing the machine learning model configured with the second set of hyperparameters to operate on the search query; and
  transmit the search results to the web server.
2. The system of claim 1, wherein the computing device is configured to:
generate a second validation score based on execution of the machine learning model configured with the second set of hyperparameters; and
determine whether at least one condition is satisfied based on generating the second validation score.
3. The system of claim 2, wherein determining whether the at least one condition is satisfied comprises:
determining that the at least on condition is satisfied; and
executing the machine learning model configured with the second set of hyperparameters to generate output data.
4. The system of claim 2, wherein determining whether the at least one condition is satisfied comprises:
determining that the at least on condition is not satisfied;
updating the parameters of the probability determination model based on the second validation score;
generating a second plurality of values corresponding to the second set of hyperparameters based on a second execution of the probability determination model;
determining a third set of hyperparameters from the pool of hyperparameters based on the second plurality of values; and
configuring the machine learning model with the third set of hyperparameters.
5. The system of claim 1, wherein the first plurality of values are probabilities.
6. The system of claim 1, wherein the probability determination model is a neural network.
7. The system of claim 1, wherein generating the first validation score based on execution of the machine learning model comprises:
training the machine learning model;
executing the trained machine learning model to operate on validation data to generate output results; and generating the first validation score based on the output results and expected results.

8. The system of claim 7, wherein generating the first validation score based on the output results and expected results comprises generating an $F_1$ score.

9. The system of claim 7, wherein training the machine learning model comprises training the machine learning model with user session data and user transaction data.

10. A method comprising:
configuring a machine learning model with a first set of hyperparameters from a pool of hyperparameters;
generating a first validation score based on execution of the machine learning model configured with the first set of hyperparameters;
updating parameters of a probability determination model based on the first validation score;
generating a first plurality of values corresponding to the first set of hyperparameters based on a first execution of the probability determination model;
determining a second set of hyperparameters from the pool of hyperparameters based on the first plurality of values;
configuring the machine learning model with the second set of hyperparameters;
receiving a search request comprising a search query from a web server;
determining search results based on executing the machine learning model configured with the second set of hyperparameters to operate on the search query; and
transmitting the search results to the web server.

11. The method of claim 10 further comprising:
generating a second validation score based on execution of the machine learning model configured with the second set of hyperparameters; and
determining whether at least one condition is satisfied based on generating the second validation score.

12. The method of claim 11, wherein determining whether the at least one condition is satisfied comprises:
determining that the at least on condition is satisfied; and
executing the machine learning model configured with the second set of hyperparameters to generate output data.

13. The method of claim 11, wherein determining whether the at least one condition is satisfied comprises:
determining that the at least on condition is not satisfied;
updating the parameters of the probability determination model based on the second validation score;
generating a second plurality of values corresponding to the second set of hyperparameters based on a second execution of the probability determination model;
determining a third set of hyperparameters from the pool of hyperparameters based on the second plurality of values; and
configuring the machine learning model with the third set of hyperparameters.

14. The method of claim 11 wherein generating the first validation score based on execution of the machine learning model comprises:
training the machine learning model;
executing the trained machine learning model to operate on validation data to generate output results; and
generating the first validation score based on the output results and expected results.

15. The method of claim 14, wherein training the machine learning model comprises training the machine learning model with user session data and user transaction data.

16. A non-transitory computer readable medium having instructions stored thereon, wherein the instructions, when executed by at least one processor, cause a device to perform operations comprising:
configuring a machine learning model with a first set of hyperparameters from a pool of hyperparameters;
generating a first validation score based on execution of the machine learning model configured with the first set of hyperparameters;
updating parameters of a probability determination model based on the first validation score;
generating a first plurality of values corresponding to the first set of hyperparameters based on a first execution of the probability determination model;
determining a second set of hyperparameters from the pool of hyperparameters based on the first plurality of values;
configuring the machine learning model with the second set of hyperparameters;
receiving a search request comprising a search query from a web server;
determining search results based on executing the machine learning model configured with the second set of hyperparameters to operate on the search query; and
transmitting the search results to the web server.

17. The non-transitory computer readable medium of claim 16 further comprising instructions stored thereon that, when executed by the at least one processor, further cause the device to perform operations comprising:
generating a second validation score based on execution of the machine learning model configured with the second set of hyperparameters; and
determining whether at least one condition is satisfied based on generating the second validation score.

18. The non-transitory computer readable medium of claim 17 further comprising instructions stored thereon that, when executed by the at least one processor, further cause the device to perform operations comprising:
determining that the at least on condition is satisfied; and
executing the machine learning model configured with the second set of hyperparameters to generate output data.

19. The non-transitory computer readable medium of claim 17 further comprising instructions stored thereon that, when executed by the at least one processor, further cause the device to perform operations comprising:
determining that the at least on condition is not satisfied;
updating the parameters of the probability determination model based on the second validation score;
generating a second plurality of values corresponding to the second set of hyperparameters based on a second execution of the probability determination model;
determining a third set of hyperparameters from the pool of hyperparameters based on the second plurality of values; and
configuring the machine learning model with the third set of hyperparameters.

20. The non-transitory computer readable medium of claim 16 further comprising instructions stored thereon that, when executed by the at least one processor, further cause the device to perform operations comprising:
training the machine learning model;
executing the trained machine learning model to operate on validation data to generate output results; and
generating the first validation score based on the output results and expected results.

* * * * *